No. 869,381. PATENTED OCT. 29, 1907.
E. A. McKOY.
TURPENTINE GATHERER'S AX.
APPLICATION FILED JULY 19, 1907.
2 SHEETS—SHEET 1.
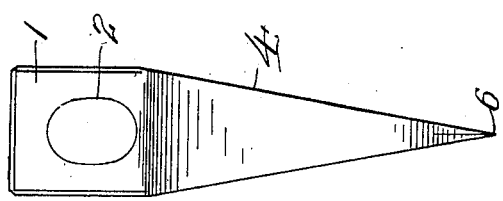
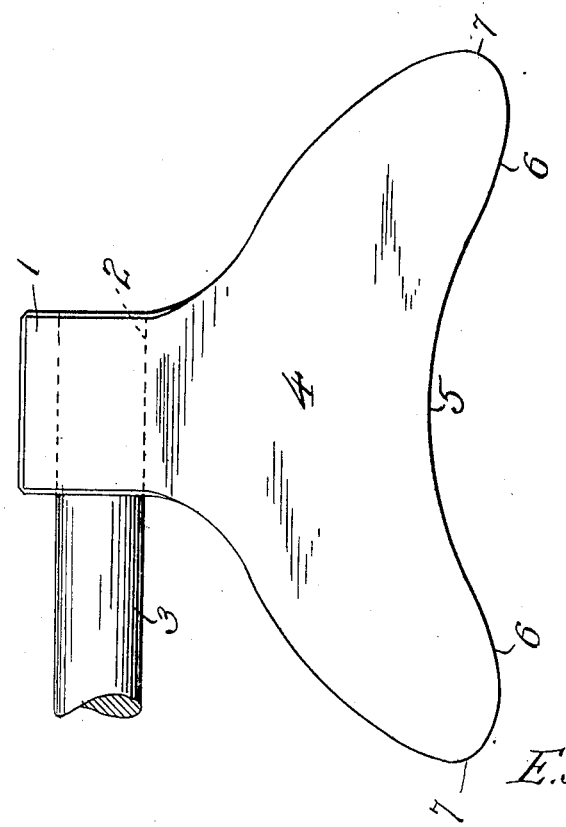

No. 869,381. PATENTED OCT. 29, 1907.
E. A. McKOY.
TURPENTINE GATHERER'S AX.
APPLICATION FILED JULY 19, 1907.
2 SHEETS—SHEET 2.
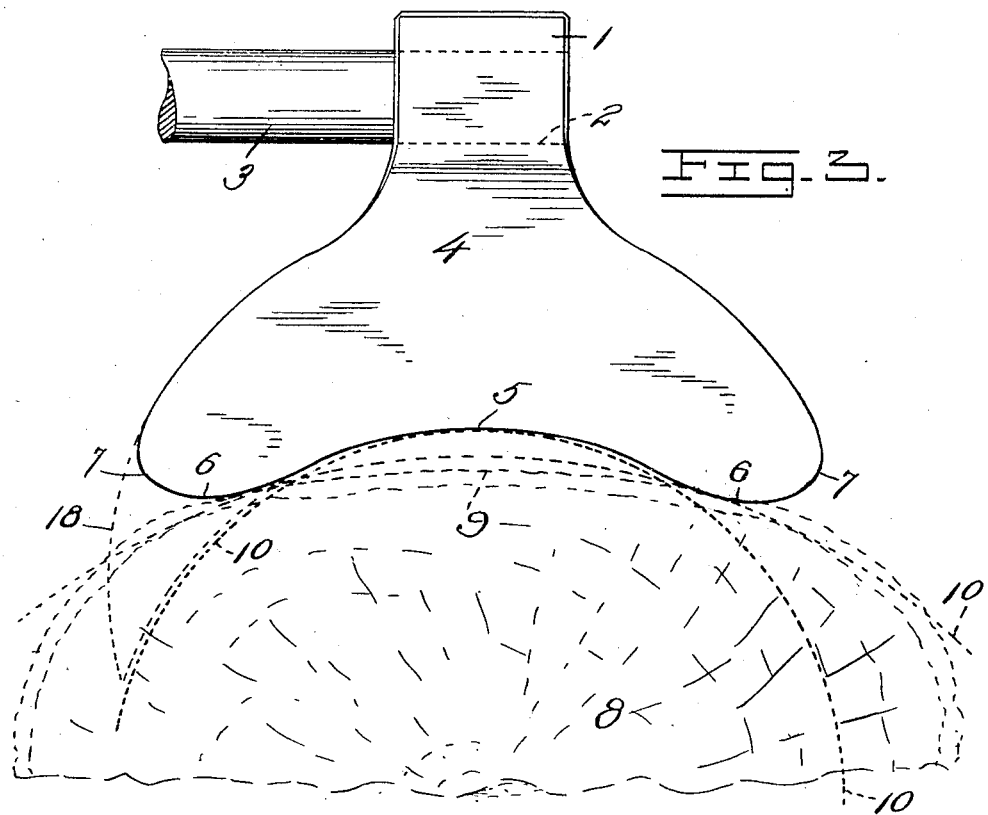
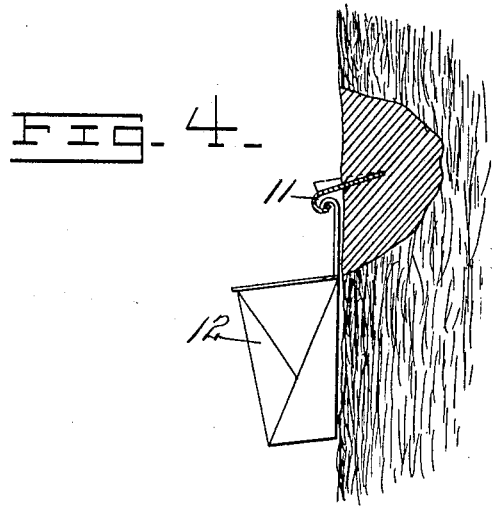
Witnesses
L. L. Armstrong.
M. A. Wood.
Inventor
E. A. McKoy,
By Howard A. Coombs
Attorney

UNITED STATES PATENT OFFICE.

EDWIN A. McKOY, OF NEW ORLEANS, LOUISIANA.

TURPENTINE-GATHERER'S AX.

No. 869,381.　　　　Specification of Letters Patent.　　　Patented Oct. 29, 1907.

Application filed July 19, 1907. Serial No. 384,584.

*To all whom it may concern:*

Be it known that I, EDWIN A. McKOY, a citizen of the United States, residing at New Orleans, in the parish of Orleans and State of Louisiana, have invented certain new and useful Improvements in Turpentine-Gatherers' Axes, of which the following is a specification.

My invention relates to the art of collecting turpentine, or other sap, from trees, and its object is to provide an improved tool for turpentine-gatherers' use, whereby curved incisions can be more readily and conveniently made in the trees, for the reception of the sheet-metal aprons which conduct the sap into the receptacles. The usual way in which these incisions are made in the trees is by means of a saw, or by means of an ax with a straight edge, which necessarily results in producing an incision of unequal depth, the center of cut being the deepest and the ends of the cut running out. Another objection to this manner of making the incisions lies in the fact that the strength of the tree is diminished by the depth of the cut, especially when incisions are made on opposite sides of the same tree. For these reasons an ax with a concave cutting edge has been proposed, by means of which the incision is made more nearly of uniform depth. This ax has, however, an edge of uniform concave curvature which terminates in sharp points, and, consequently, while suitable for use on trees of certain sizes, is not adapted for satisfactory use on trees of widely different curvatures.

My invention obviates this objection, as it enables one and the same ax to be conveniently used to make the incisions on both small and large trees, as well as on trees that are somewhat flat-sided.

The invention consists in an ax having a head and a broad blade, the head being provided with an eye for the handle running parallel to the plane of the blade, and the blade having a concave cutting edge in the center and for the major part of its length, said edge merging towards the ends into convex cutting edges, which terminate in rounded ends.

In the accompanying drawing—Figure 1 is a side-elevation of my improved ax; Fig. 2 is an end elevation of the same; Fig. 3 is a partial horizontal section through a somewhat flat-sided tree, showing in full lines the edge of the improved ax in position to make an incision, and in dotted lines the position of the concave edge of an old form of ax, also in dotted lines, the outlines of trees of different sizes. Fig. 4 is a partial side-elevation and partial vertical section of a tree with the apron inserted in the incision and supporting a receptacle.

The ax comprises a head 1, provided with an eye 2, for the reception of the handle 3, and a broad blade 4 extending laterally in each direction from the center line of the shank and tapering downwardly therefrom towards the cutting edge. This blade is formed with a central concave cutting edge 5, which merges towards the ends into the convex cutting edges 6, which are rounded off at the corners 7, 7.

In Fig. 2, 8 represents the trunk of a sap-bearing tree, having a somewhat flat side 9, and 10 represents the outlines of trees of different diameters. The edge of my improved ax is shown in position to commence the incision, and the dotted line 18 represents the position which an ax with an edge of uniform concave curvature from point to point would take. It will be seen that the points of the latter, contacting with the surface of the tree, hold the center of the edge at a considerable distance from said surface, while the rounded corners of my improved ax permit the center of the concave cutting edge to approach more closely to the tree. In use, it would be almost impossible to drive the points of the ax, having the edge formed in a uniform curve from corner to corner, sufficiently far into the tree to bring the center of the concave into the wood at all, and, furthermore, there would be considerable danger of breaking off the points. With its edge of double curvature and rounded corners, my ax is adapted for and gives equally good results when used on trees of different diameters or shapes, as will be evident from Fig. 2.

In Fig. 4, an apron 11 is shown inserted into an incision made by the new ax, a receptacle 12 being supported from said apron. The incision is made by holding the ax at an upwardly inclined angle with its edge against the tree and driving it in by blows delivered with a maul on the head of the ax. The taper of the blade makes it act as a wedge to separate the fibers of the wood, the result being that, when the apron is inserted, which is done immediately after the incision is made, the fibers reëxpand and clamp the apron firmly.

What I claim is—

1. An ax for turpentine-gatherers' use, comprising a broad blade having a concave cutting edge in the center and convex cutting edges near the ends.

2. An ax for turpentine-gatherers' use, comprising a shank, a broad blade extending downwardly and laterally therefrom, the edge of said blade being concave at its center, and convex at its ends.

3. An ax for turpentine-gatherers' use, comprising a broad blade having an edge of double curvature.

4. An ax for turpentine-gatherers' use, comprising a shank having a flat head and an eye for a handle, a broad blade tapering downwardly from said shank and extending laterally in both directions therefrom, said blade having a concave cutting edge merging near the ends into convex cutting edges and having rounded corners.

In testimony whereof I have affixed my signature, in presence of two witnesses.

EDWIN A. McKOY.

Witnesses:
　CORNELIUS ECKHARDT,
　HOWARD A. COOMBS.